April 17, 1945.　　　O. L. OWENS　　　2,373,848
WAGON DUMP
Filed June 29, 1942　　　2 Sheets-Sheet 1

Inventor
Owen L. Owens
By Williamson & Williamson
Attorneys

April 17, 1945. O. L. OWENS 2,373,848
WAGON DUMP
Filed June 29, 1942 2 Sheets-Sheet 2
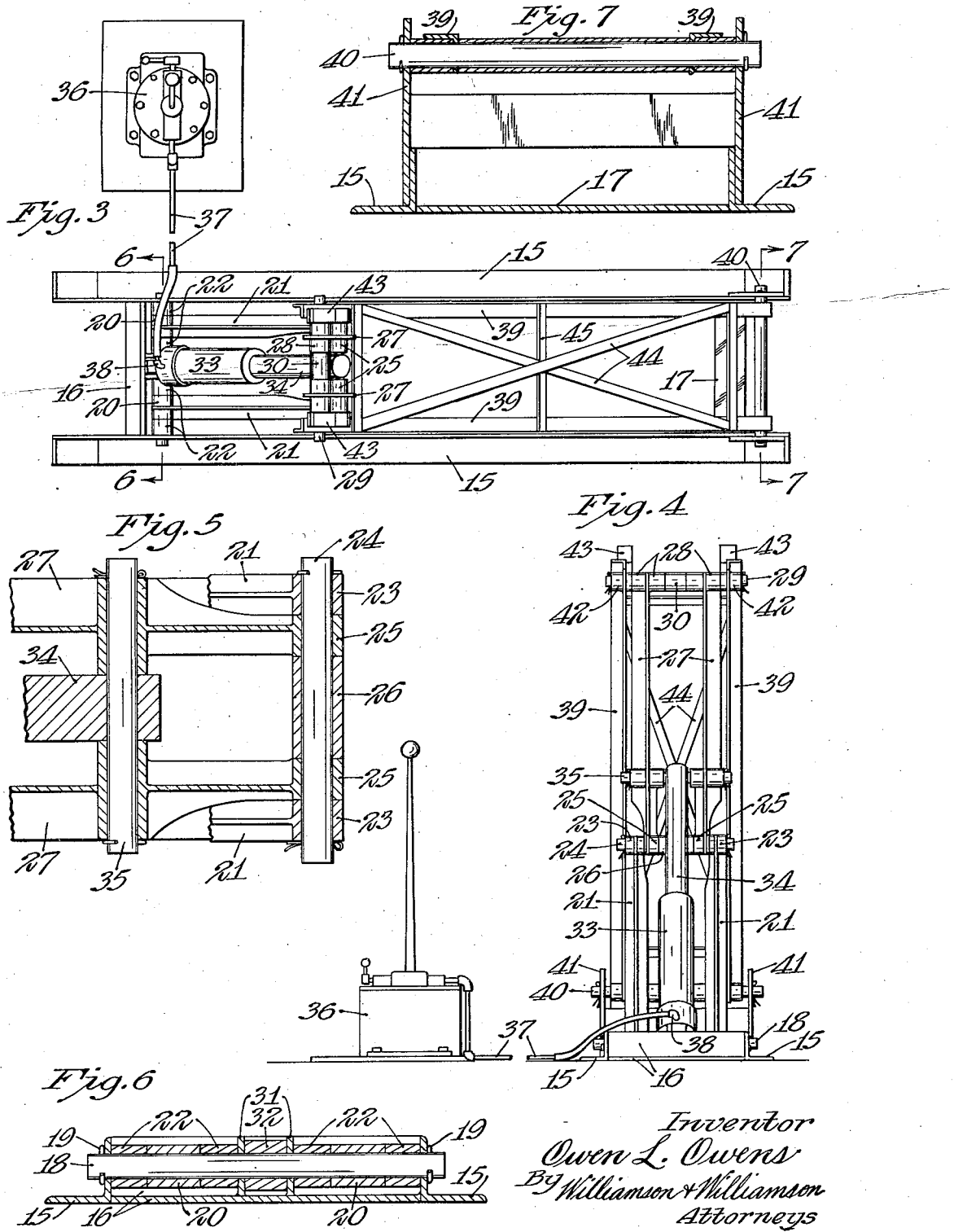
Inventor
Owen L. Owens
By Williamson & Williamson
Attorneys Patented Apr. 17, 1945

2,373,848

UNITED STATES PATENT OFFICE 2,373,848

WAGON DUMP

Owen L. Owens, Minneapolis, Minn.

Application June 29, 1942, Serial No. 448,921

1 Claim. (Cl. 254—113)

This invention relates to wagon dumping devices and is particularly adaptable for use in dumping grain wagons where the load is to be transferred from the wagon to the hopper of a grain elevator.

Frequently portable grain elevators are utilized to load grain into storage structures and means has heretofore been used for elevating the front end of the grain wagon so that the contents of the wagon will slide out of the rear of the wagon box and into a hopper at the bottom of the elevator.

Portable elevators have been used to a considerable extent and so-called portable wagon dumps have also been devised. However, the ordinary wagon dump is relatively heavy and clumsy and it is difficult to move from place to place. It is also difficult to maneuver the wagon into position relative to the dumping device so that it can be properly connected thereto.

It has previously been customary to operate the wagon dumps with a power take-off from the power source which operates the grain elevator. As a result the power plant for the elevator must have considerably greater horse power than required to operate the elevator alone.

It is an object of my invention to provide a portable hydraulically actuated wagon dump wherein the hydraulic mechanism is preferably manually operated, thus permitting the use of a smaller power unit for actuating the elevator with which the wagon dump is associated.

Another object of my invention is to provide a relatively light, strong, and compact wagon dump which is so constructed that a grain wagon or the like can be conveniently driven over it and stopped in proper position for lifting contact by the dumping apparatus, the device being so constructed that it will not interfere with the movement of horses drawing the wagon so that the proper positioning of the wagon is in no way hampered.

Another object of the invention is to provide an easily portable device which, while extremely compact and relatively flat when in its collapsed position to prevent interference with the team and the wagon, can be quickly manipulated to raise the forward end of the wagon a considerable distance from the ground to secure the proper dumping action.

Another object of the invention is to provide a portable wagon dump of relatively light weight which has considerable strength and which is provided with power actuating means so that heavy loads can easily and quickly be dumped.

These and other objects and advantages of the invention will more fully appear from the following description made in connection with the accompanying drawings, wherein like reference characters refer to the same parts throughout the views, and, in which:

Fig. 3 is a plan view of the device in raised position;

Fig. 4 is an end view of the device in raised position;

Fig. 5 is an enlarged sectional view through the two intermediate bearings of the toggle arm;

Fig. 6 is an enlarged section taken approximately on line 6—6 of Fig. 3; and

Fig. 7 is an enlarged section taken approximately on the line 7—7 of Fig. 3.

Figure 1:
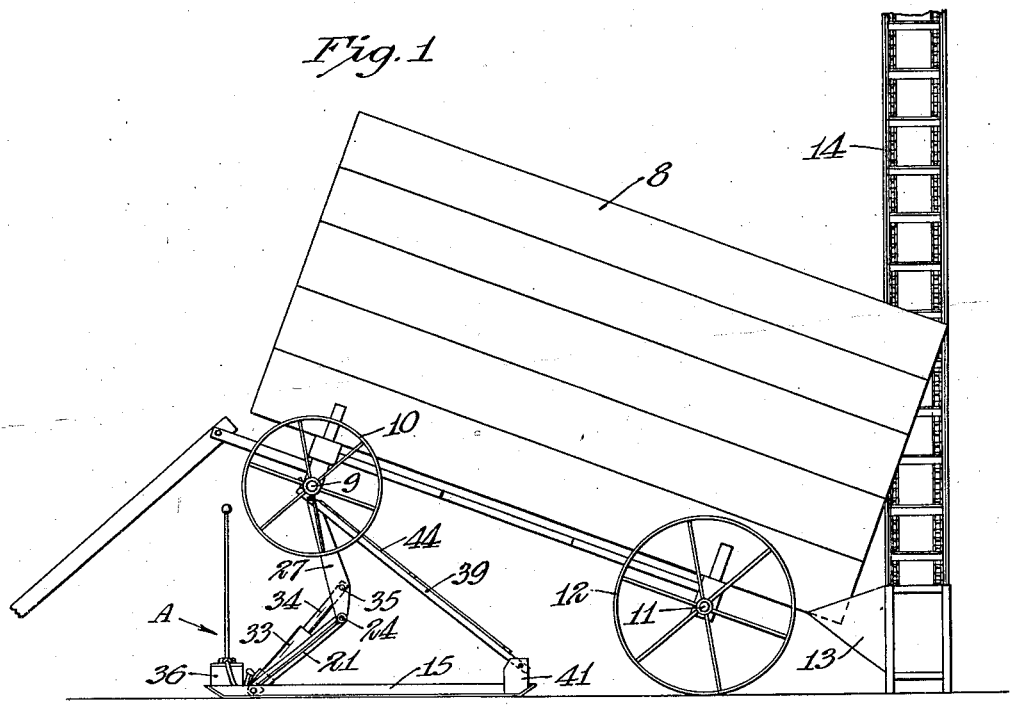
Fig. 1 is a side elevation of a wagon supported in dumping position by my device and showing an end view of a portion of a grain elevator into which the load is to be dumped and also showing the hydraulic power unit.

In Fig. 1 there is shown a wagon 8 which has a front axle 9 having wheels 10 thereon and a rear axle 11 carrying wheels 12. The wagon 8 is shown supported in tilted position by my improved device indicated generally at A, the front axle 9 resting upon the dumping apparatus so that the wagon load will slide into a hopper 13 at the bottom end of an elevator, generally shown at 14. The details of the elevator are not shown since they do not form a part of the invention and are well understood in the art.

Figure 2:
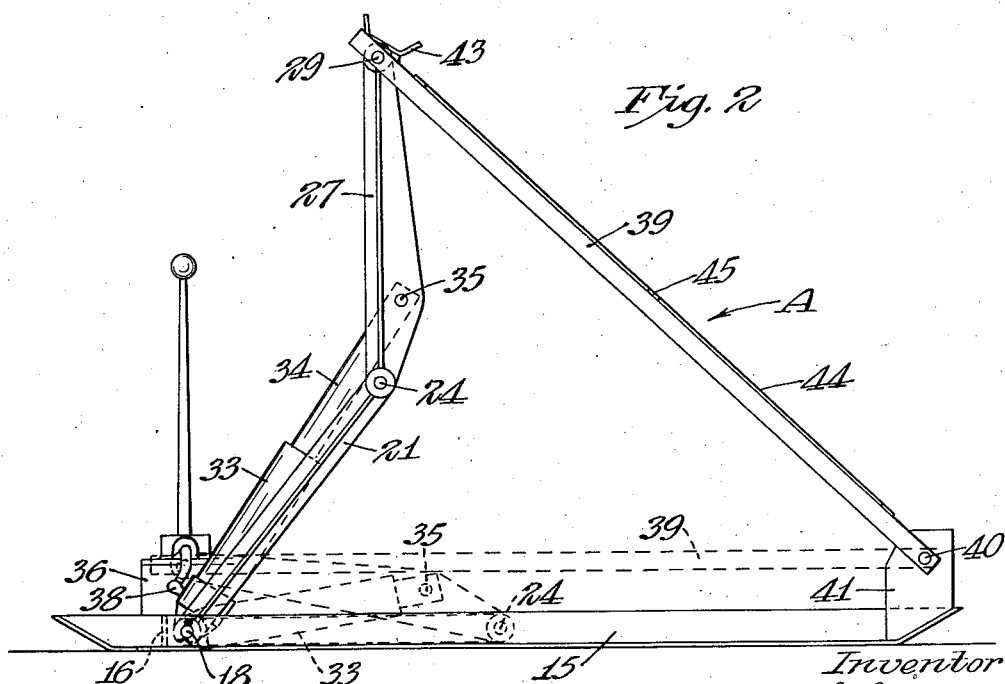
Fig. 2 is an enlarged side view of the wagon dump showing it elevated in full lines and in folded or collapsed position in dotted lines.

My improved wagon dump A is provided with a pair of longitudinal base members 15 which are adapted to rest upon the ground. The base members 15 are connected at their left-hand or forward ends by an angle iron 16 and at their rear ends by a transverse plate 17. As indicated in Figs. 1 and 2 the ends of the base members 15 are slanted so that the device can be easily shifted longitudinally over the ground, and referring particularly to Fig. 1 it can readily be seen that said base members 15 extend only a short distance above the ground, so flat, in fact, that the base made up the members 15, 16 and 17 can be considered substantially flat with respect to their height above the ground.

Extending between the upright portions of the base side members 15 angle irons forming the base side members 15 adjacent their left-hand or forward ends is a shaft 18 having cotter pins 19 therethrough on the outer sides of the frame members 15 to prevent lateral movement of said shaft 18. Journalled on the shaft 18 are bearings 20 forming the lower ends of a pair of toggle arms 21 which preferably are T-shaped in cross section. Spacers 22 on the shaft 18 hold said bearings 20 and toggle arms 21 in the desired spaced relationship. The opposite ends of the toggle arms 21 are provided with bearings 23 which are mounted on a cross shaft 24. The shaft 24 has additional bearings 25 mounted thereon and between these bearings is a spacer sleeve 26. The bearings 25 form ends of a second pair of toggle arms 27 which are formed of angle irons and the opposite ends of said arms 27 have bearings 28 on a shaft 29 separated by a spacer 30.

The base cross member 16 is provided with a pair of centrally disposed lugs 31 through which the cross shaft 18 extends. Between the lugs 31 is a bearing 32 formed on an end of a hydraulic cylinder 33, said cylinder being mounted for rocking movement on said shaft 18. A piston rod 34 extends outwardly from the opposite end of said cylinder 33 from its pivotal connection with the shaft 18 and, as viewed in Fig. 2, the upper end of the piston rod 34 is pivotally connected to a cross shaft 35 extending between the upper pair of toggle arms 27.

Fluid under pressure is fed to the cylinder 33 from a hydraulic pump 36 which has a feed line 37 connected to an end of said piston 33 by a nipple 38 shown in Figs. 3 and 4. The hydraulic pressure line 37 is preferably of considerable length so that the pump 36 can be actuated from a point some feet away from the wagon dump device per se. The details of the pump 36 need not be explained since it is of conventional type such as manufactured by Blackhawk Manufacturing Company of Milwaukee, Wisconsin.

In order to guide the toggle arms 27 I provide a pair of swinging guide bars 39 whose right-hand ends are pivotally mounted on a shaft 40 which is journalled between a pair of plates 41 extending a short distance up from the right-hand or rear ends of the base side members 15. The left-hand ends of the bars 39 are provided with bearings 42 mounted on the extremities of the upper cross shaft 29 which also connect with the upper ends of the upper pair of toggle arms 27. Wagon axle engaging members 43 are mounted on the upper ends of said toggle guide bars 39. The toggle guide bars 39 are braced by cross braces 44 and a central transverse cross member 45.

When a wagon is driven up to the elevator to be dumped the grain elevator hopper 13 which is usually swingable is swung to one side and the draft horses are walked past either side of the base members 15 it being noted that the dumping device is relatively long and narrow, and the wagon is brought to a stop with the front axle 9 positioned above the axle receiving saddles 43 described just above. The apparatus at this time is in the collapsed position shown in dotted lines in Fig. 2 and it can readily be seen that when so collapsed the entire device is substantially flat on the ground so that the wagon can be positioned over it with no interference whatsoever. The hydraulic pump 36 is then actuated and hydraulic pressure admitted to the cylinder 33, and the piston rod 34 is pushed outwardly relative to cylinder 33. Again referring to the dotted line position of the device in Fig. 2 it will be seen that the shaft 35 is out of alignment with shafts 18 and 24 and, therefore, the toggle unit made up of the pairs of arms 21 and 27 will be straightened out. This extends the apparatus upwardly and elevates the forward end of the wagon 8 so that the crop will be dumped from the rear as illustrated in Fig. 7.

As stated above the base made up of the side members 15 and its cross members 16 and 17 is relatively narrow and when the device is collapsed to the dotted position of Fig. 2 a wagon can be easily driven up to straddle and lie over the apparatus. The hydraulic pump 36 was stated to be positioned remotely from the lifting mechanism, and it is to be understood that it is sufficiently spaced so that it will not interfere with the driving of a wagon over the toggle mechanism. The pressure feed pipe 37 which connects the pump 36 to the cylinder 33 can either be pressed into the ground or protected by boards laid at either side so that the wagon wheels will not injure it.

As stated in the first part of the specification I have provided a wagon dump which not only embodies the features of compactness and closeness to the ground when collapsed, but which is actuated by a hydraulic power unit entirely independent of the power unit used to run the elevator 14, consequently enabling the use of a much smaller power unit on the elevator than has been used heretofore. The hydraulic unit for actuating the wagon dump is compact and can be easily operated by hand. Although the hydraulic pump is stated to be of conventional construction it has considerable advantage when used in conjunction with the wagon dump shown and described.

From the foregoing description it will be seen that I have provided wagon dumping mechanism which is sturdily constructed, yet compact in size, so that it is readily portable and more important it can be collapsed to the position shown in dotted lines in Fig. 2 so that the entire toggle unit and base are relatively flat on the ground. The structure is narrow in width and this feature in combination with the flat folding therefore makes it unusually easy to drive a wagon over it and stop it in proper position for dumping. Also it is unnecessary to fasten the wagon dump to the wagon in any manner as is the case with conventional dumps having inverted U-frames and hoisting chains which are secured to the wagon.

It will, of course, be understood that various changes may be made in the form, details, arrangement and proportions of the various parts without departing from the scope of my invention.

What is claimed is:

In a wagon dump, a substantially flat base including a pair of spaced side members, a first pair of parallel toggle arms having adjacent ends pivotally connected between said side members adjacent a first end of said base, the opposite ends of said toggle arms being swingable upwardly from said side members and also swingable downwardly between said side members, a second pair of parallel toggle arms having adjacent inner ends pivotally connected to said opposite ends of said first toggle arms, said second pair of toggle arms being swingable upwardly above said opposite ends of said first toggle arms and being swingable downwardly to a position substantially horizontally parallel to said first toggle arms with the latter in their downwardly swung position, a toggle guide bar pivotally connected to the outer ends of said second toggle arms, said toggle guide bar being pivotally connected to those ends of said base side members remote from said first end of said base, and an extensible toggle operator having one end pivotally connected between said side members of said base and having its other end pivotally connected between said second toggle bars.

OWEN L. OWENS.